US007379817B1

(12) United States Patent
Tyson et al.

(10) Patent No.: US 7,379,817 B1
(45) Date of Patent: May 27, 2008

(54) FORMULATION OF DAILY WEATHER OBSERVATION

(75) Inventors: Bradley Lyon Tyson, Atlanta, GA (US); Jeral Garcia Estupinan, Atlanta, GA (US); Joseph Paul Koval, Atlanta, GA (US)

(73) Assignee: The Weather Channel, Inc., Atlanta, GA (US)

(*) Notice: Subject to any disclaimer, the term of this patent is extended or adjusted under 35 U.S.C. 154(b) by 0 days.

(21) Appl. No.: 11/285,333

(22) Filed: Nov. 22, 2005

(51) Int. Cl.
*G01W 1/00* (2006.01)

(52) U.S. Cl. ......................................................... 702/3
(58) Field of Classification Search .................... 702/3, 702/4
See application file for complete search history.

(56) References Cited

U.S. PATENT DOCUMENTS

| 5,654,886 | A  | * | 8/1997 | Zereski et al. ................. 702/3 |
| 6,542,825 | B2 | * | 4/2003 | Jones et al. ..................... 702/3 |
| 6,584,447 | B1 | * | 6/2003 | Fox et al. ....................... 705/10 |
| 6,778,929 | B2 | * | 8/2004 | Egi ............................... 702/104 |
| 6,823,263 | B1 | * | 11/2004 | Kelly et al. .................... 702/3 |
| 6,961,061 | B1 | * | 11/2005 | Johnson et al. ............. 345/473 |
| 7,080,018 | B1 | * | 7/2006 | Fox et al. ....................... 705/1 |
| 2004/0215394 | A1 | * | 10/2004 | Carpenter et al. ............. 702/3 |

\* cited by examiner

*Primary Examiner*—Donald E McElheny, Jr.
(74) *Attorney, Agent, or Firm*—Woodcock Washburn LLP

(57) ABSTRACT

Methods and articles of manufacture for providing an indication or representation that describes the state of weather over a period in the past for a particular location. Observation data for the location is accumulated and stored over the period. Because forecast engines exist and can be adapted for use in determining the indication of weather, the observation data is converted into a format of forecast data. The data is then grouped into subsets and processed as forecast data. For each subset, a representation of weather is determined. The representations of weather for each subset are then processed to determine the representation of weather for the period of time.

21 Claims, 6 Drawing Sheets

FORMULATION OF DAILY WEATHER OBSERVATION

FIELD OF THE INVENTION

The present invention relates to weather data. In particular, the present invention is directed to a system and method of utilizing observed weather data to provide a representation of historical weather conditions.

BACKGROUND OF THE INVENTION

In the United States, the commercial weather sector provides forecasts, observations, and other meteorological content to consumers for direct fees and other forms of compensation. There is, at any time, a strong drive for value-added differentiation in this sector, since most of the basic weather forecast and observational and historical data freely originates from the National Weather Service (NWS).

Historical weather information includes a high/low temperature for the day, a precipitation amount, and a precipitation type for a particular day in the past. While users may be able to find more detailed information regarding the previous 24 hours, such as the hourly observations, this information is not generally retained for greater periods of time. Other services maintain historic weather conditions for particular days in the past, however, these services do not use weather logic to derive the weather shown as representative for the whole day. Rather, such services use the "highest" or most severe weather for that day and assign that weather to the whole day as the most representative weather. For example, from weather conditions such as rain, cloudy and snow, the "highest" weather would be snow. As another example, from clear, cloudy, flurries, the "highest" weather would be flurries. Thus, conventional services would assign snow or flurries in the previous examples even if highest weather only occurred for an hour.

Thus, there is not an indicator that provides the end user with an indication that the average weather over the course of a day in the past was "partly sunny," "mostly cloudy," etc. Such an indication of average or typical weather for a day is desirable.

Thus, there is a need for a system that can provide historical weather conditions to provide end users with an indication of the average weather for a particular day at a particular location. The present invention provides for such a system.

SUMMARY OF THE INVENTION

The present invention is directed to methods and articles of manufacture for providing an indication or representation that describes the state of weather over a period in the past for a particular location. Observation data for the location is accumulated and stored over the period. Because forecast engines exist and can be adapted for use in determining the indication of weather, the observation data is converted into a format of forecast data. The data is then grouped into subsets and processed as forecast data. For each subset, a representation of weather is determined. The representations of weather for each subset are then processed to determine the representation of weather for the period of time.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention where like elements have like reference numerals; however, the invention is not limited to the specific methods and instrumentalities disclosed. In the drawings.

DETAILED DESCRIPTION OF ILLUSTRATIVE EMBODIMENTS

The present invention provides systems and methods for providing a representation (e.g., textual, iconic, graphical, etc.) that describes the state of historical weather over a period of time, such as 12 or 24 hours. Preferably, the representation is determined using existing forecast engines, as described below. As such, temporal logic is used to determine the representative weather for the period of time. The temporal logic also enables the provision of a description of the progression of weather during a given day after it is matched with textual expressions. The representation provides an indication of average weather over the period of time from a historical view.

FIGS. 1-2 and 3-4, respectively, illustrate the flow of weather data and processes to create a representation of the state of weather for a particular day. Observations are taken from points throughout a geographic area 100, such as the United States (step 150). It is preferable to use METeorological Aerodrome Report (METAR) data as the observation data. Typically, METAR data for a site is provided at the top of the hour (e.g., 1:00, 2:00, etc.). Under certain conditions, METAR data is provided more often. For each point of interest (e.g., Site A 102 or Site B 104) the observation data is stored (step 152).

Figure 1:
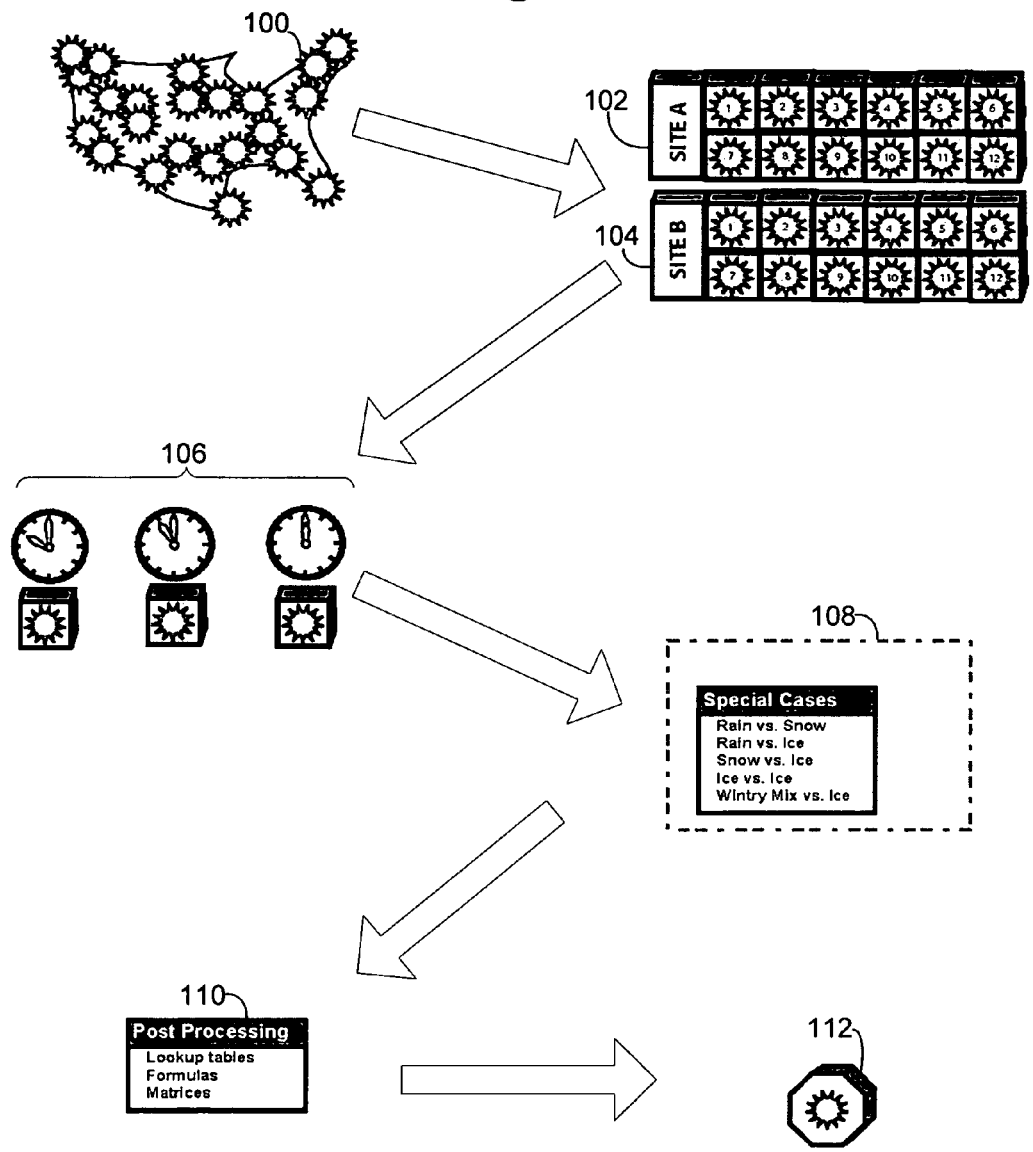
FIGS. 1-2 are an overview of data flow in the present invention.
Figure 2:
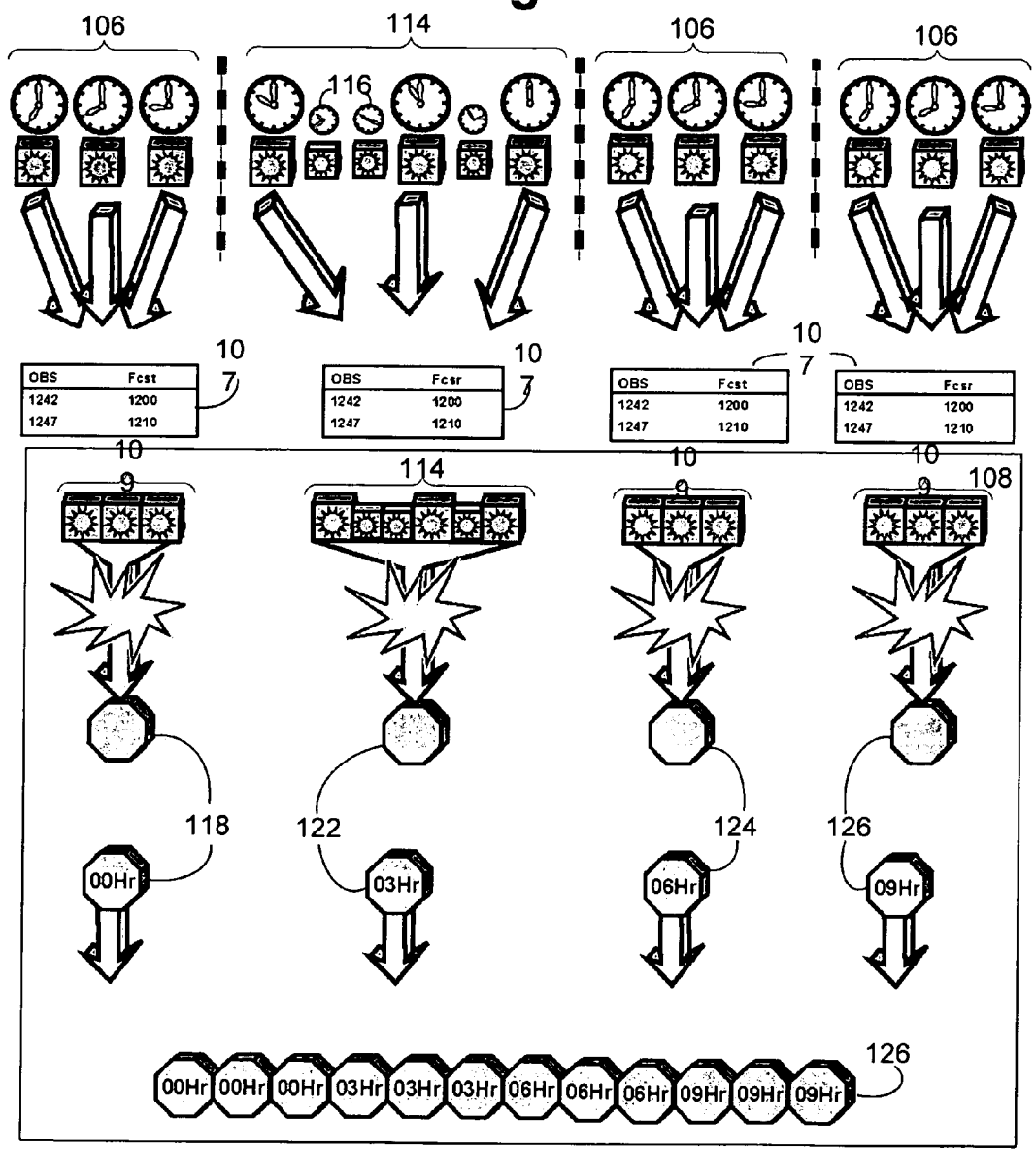
Figure 3:
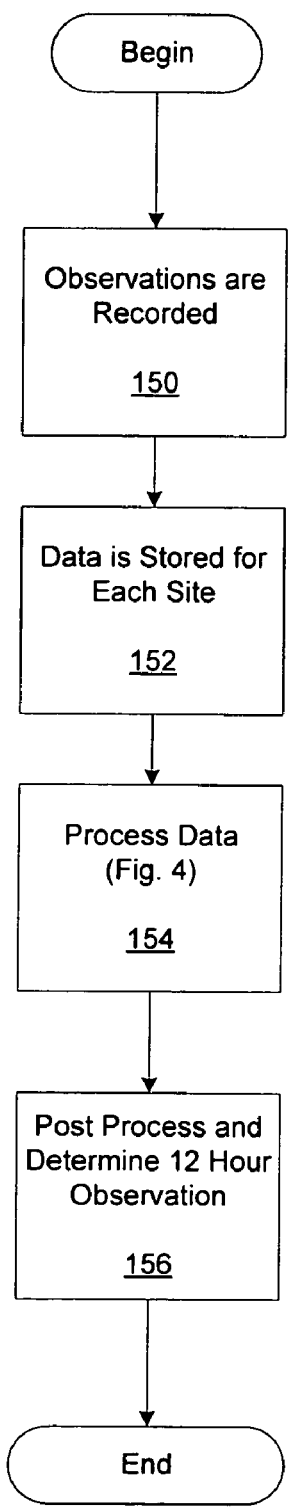
FIGS. 3-4 are flowcharts illustrating the exemplary processes performed by the present invention.
Figure 4:
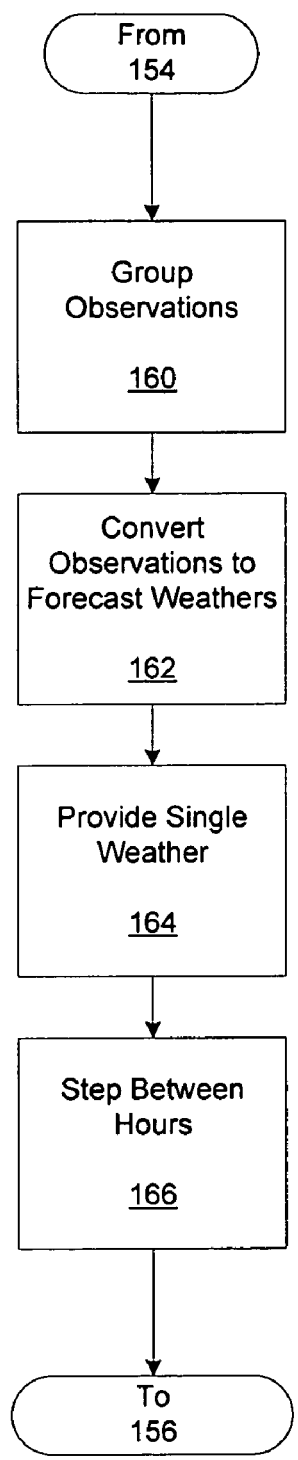

The observations are broken down into sub-periods 106/114 having three hours of data in sub-period period 106/114 (steps 154 and 160). As shown in FIG. 2, each sub-period 106/114 may have a given number of observations. For example, a first sub-period 106 of three hours has three observations, a second sub-period 114 of three hours may have six observations (including three special observations), a third sub-period of three hours has three observations, and a fourth sub-period also has observations. Each sub-period may have additional or fewer observations and FIG. 2 is being shown for exemplary purposes only.

The next step is to pass each of the observations throughout the day or evening portion for processing in order to produce a single weather representation for each of the sub-periods. In order to produce the single weather representation, the observation data is converted to forecast weather (step 162). This is performed such that existing forecast engines can process the observation data. The observation data is converted by providing more descriptive detail about the observation, such as the observed weather is partly cloudy, rain, thunderstorms, etc. In addition the process may include converting degrees Celsius to degrees Fahrenheit, etc. The conversion to forecast weather is preferable because it maintains consistency between forecasts and actual observed weather conditions as the same rules and processing steps are applied to the data.

The conversion at step 162 may be performed as follows. The METARS are first decoded and placed into a format that takes a series of METAR codes that represent weather variables and determines the observation weather best described by the weather variables. As shown at 107, each of the observation weathers may have a unique numeric code assigned to them in accordance with several forecast weathers that are represented by a different set of numeric codes than the observation weathers. A meteorologist may determine the proper matching between the two lists of numeric codes or this may be performed via a computer-implemented conversion engine. The differences between observation weathers and forecast weathers may be non-existent (e.g., forecast weather: snow; observation weather: snow) or may vary quite a bit (e.g., forecast weather: clear; observation weather: dust storm), thus requiring this mapping. By placing these observation weathers into the forecast weather space via, e.g., conversion tables, determinations can be made on the underlying forecast vector. A forecast vector is the series of weather parameters (e.g., temperature, wind speed/direction, relative humidity, probability of precipitation (pop), conditional probability of rain/snow/ice, quantitative precipitation forecast) that make up the forecast weather.

Next, observation (converted to forecast) information for one of the sub-periods is provided to a forecast engine 108 and combined to a single indication of weather (step 164). As shown in FIG. 2, the three-hour sub-periods of hourly data 109 or 115 are processed according to the forecast engine rules to an hourly resolution 118, 122, 124 and 126. The hourly resolution may be used to populate a file 126 that is processed to determine the final presentation of weather for the period (step 166). For example, the file 126 may include twelve representations for each of the twelve hours, where the 00 Hr representation 118 is used for 00-02 Hrs., the 03 Hr representation 122 is used for 03-05 Hrs., the 06 Hr representation 124 is used for 06-08 Hrs., and the 09 Hr representation 126 is used for 09-11 Hrs.

The forecast engine 108 places the forecast weathers into groups of similar impact and phase characteristics (e.g., snow, light snow, heavy snow, etc.). By grouping the weathers, they can be ranked within the groups by severity, and the groups themselves can be ranked by severity. The severity may be determined by meteorologists and, as noted above, ranks the various types of weather conditions, such that, e.g., "heavy snow" may be more severe than "cloudy," etc. Applying a comprehensive listing of rules and "special cases," the forecasts are rolled-up in step 160 utilizing their defined rankings and groups to provide a best weather that encapsulates the set.

A post processor 110 receives the file 126 and may break the 12 hours of data into two 6 hour periods to create two representations of the observed weather. The final step (step 156) is to use the look-up table to derive a representation 112 of the entire twelve hours. The post processor 110 is initialized after the forecasts are in an hourly format. The post processing engine calls the forecast logic to determine the best weather for the two 6-hour blocks that comprise a 12 hour period. The post processor 110 takes a series of temperatures, wind speeds, etc. (i.e., the forecast vectors) as well as numbers that represent forecasts and produces the weather information in a usable, consumer friendly representation 112. The representation 112 indicates the most significant weather that occurred during the 12 hour time period. This representation 112 may then be stored and made available with the conventional historical weather information to provide additional detail to end users about the weather. The consumer friendly representation 112 may includes phrases, icon codes, weather narratives, temporal descriptions, etc.

In addition to providing a useful indication of the weather for a particular day, the observed weather representation may be used to compare to the observed weather to the forecast for that day to determine the accuracy of the forecast. This provides a beneficial tool to aid in tuning and refining forecast engines in order to increase the accuracy and reliability of the forecasts.

The above-noted processes may be performed on a general purpose computer programmed to perform the above processes running, e.g., Microsoft Windows, Linux, UNIX, etc. The observation data may be stored in a database where it may be retrieved and processed by the forecast engine. The processes may be distributed among several computers that are connected via, e.g., a network infrastructure.

Figure 5:
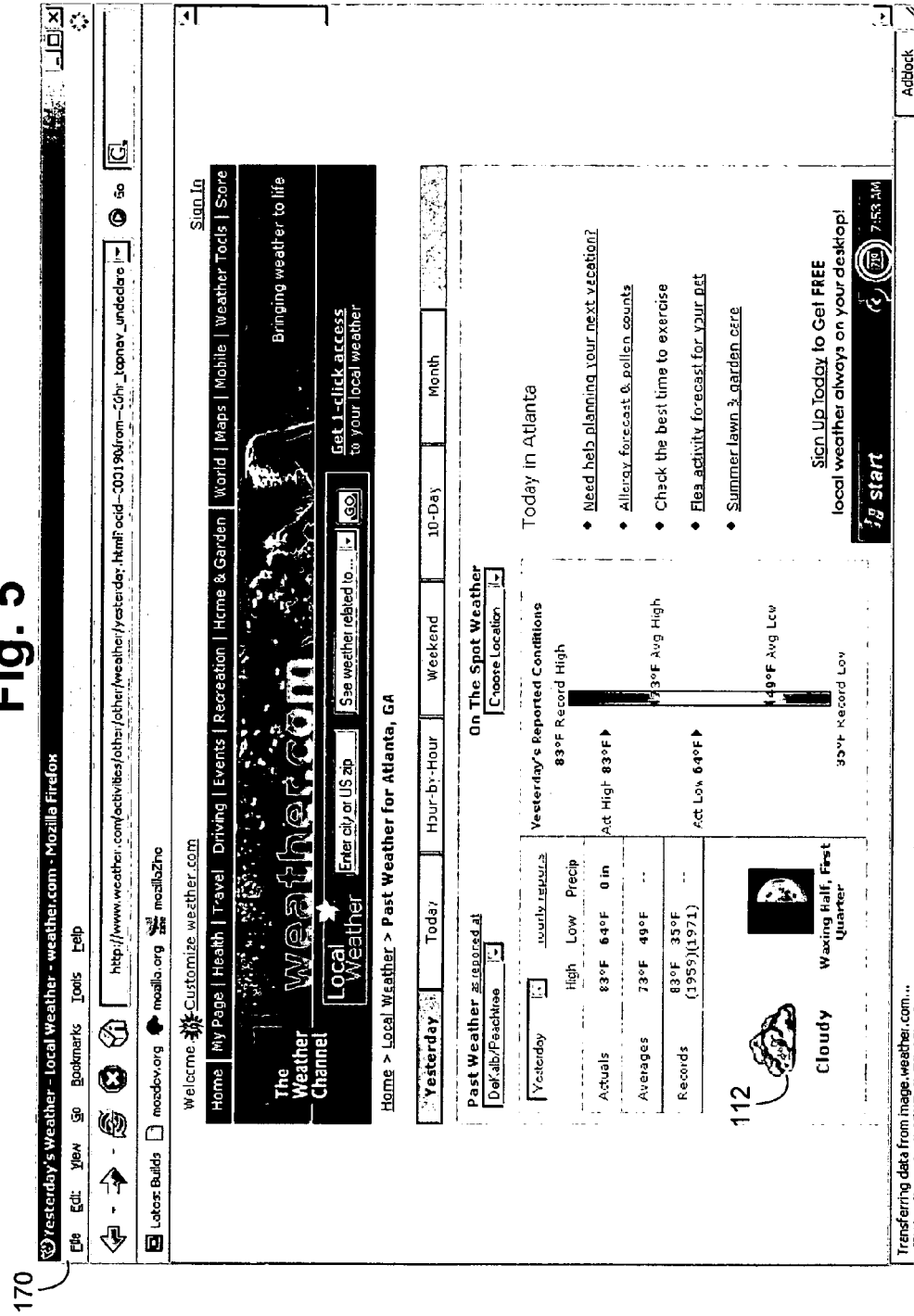
FIG. 5 is an exemplary webpage showing an indicator of weather together with other historical information.
Figure 6:
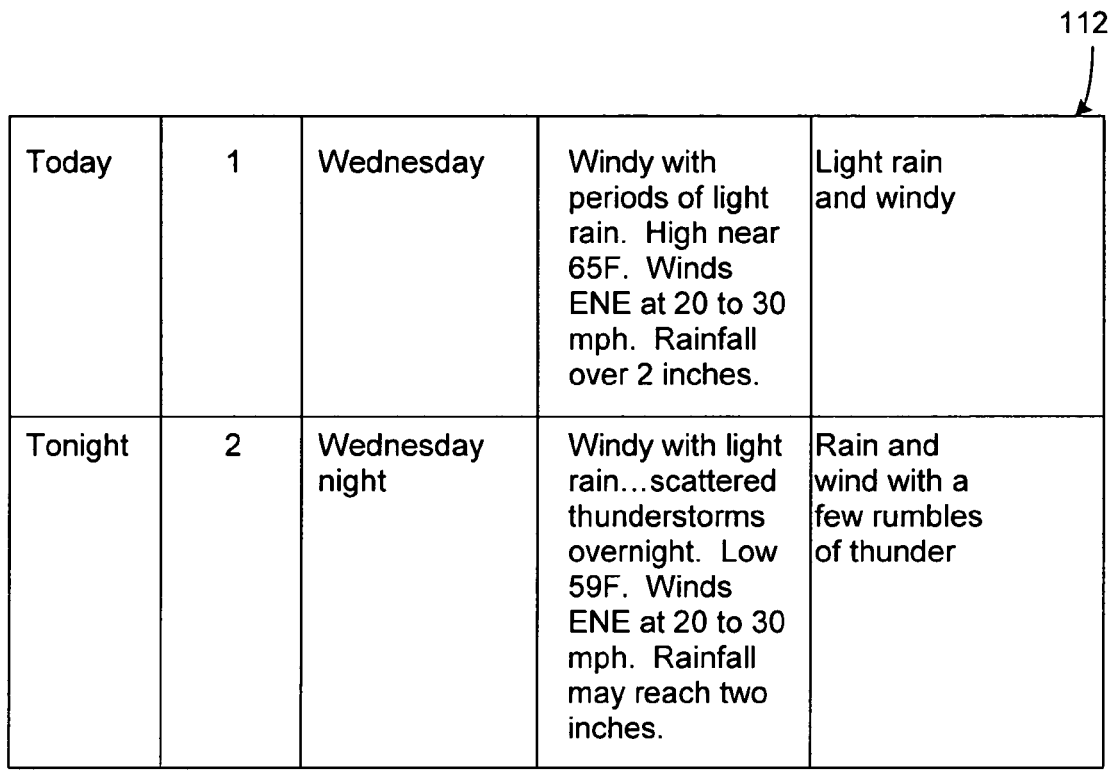
FIG. 6 shows an exemplary narrative of historical weather for a location.

FIGS. 5 and 6 illustrate variations of the representation 112. Those of ordinary skill in the art would recognize that other variations are possible. Referring now to FIG. 5, there is illustrated a webpage 170 showing the representation 112 of weather for the selected day. The representation 112 is shown as an icon together with text describing the conditions for the day. More descriptive detail may be provided if conditions warrant. FIG. 6 illustrates a narrative representation 112 of the historical weather conditions for a particular day in the past that may be provided.

Thus, the present invention provides a novel indicator of historical weather conditions. The indicator may also be used to fine tune forecasts. The processes noted above may be implemented on a variety of computer platforms, and application specific operating systems. These processes may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of providing an indication of average weather for a location over a predetermined past period of time, comprising:

receiving observation data for said location for said predetermined past period of time;

converting said observation data to a forecast data format;

processing said forecast data format to provide said indication of average weather; and producing to a user a representation of said indication of average weather over said predetermined past period of time.

2. The method of claim 1, further comprising:

grouping the observation data into sub-periods of time;

processing each sub-period of time to determine an indication of average weather for each sub-period of time; and processing the indication of average weather for each sub-period of time to determine the indication of average weather for said predetermined period of time.

3. The method of claim 2, further comprising ranking the observation data within each group by severity.

4. The method of claim 3, further comprising ranking each said group by severity.

5. The method of claim 1, said converting the observation data to forecast data comprising:
   representing the observation data in a first format; and
   correlating the observation data in said first format to forecast data that is represented in a second format.

6. The method of claim 5, said first format and said second format comprising a numerical format.

7. The method of claim 1, further comprising providing said indication of average weather as one of an icon, text, and an indication of forecast accuracy.

8. The method of claim 1, further comprising comparing said indication of average weather with a forecast for said predetermined period of time to determine an accuracy of said forecast.

9. The method of claim 8, further comprising refining a forecast engine based on said accuracy of said forecast.

10. A method for providing an indication of historical average weather for a location over a predetermined past period of time, comprising:
    storing observation data for the location for said predetermined past period of time;
    grouping the observation data into sub-periods of time;
    converting the observation data in each sub-period of time into a format of forecast data;
    processing the converted forecast data for each sub-period to provide an indication of average weather for each sub-period;
    processing said indication of average weather for each sub-period into said indication of historical average weather over said predetermined past period of time; and
    outputting said indication of historical average weather over said predetermined past period of time to an output system.

11. The method of claim 10, further comprising ranking the observation data within each sub-period by severity.

12. The method of claim 11, further comprising ranking each said sub-period by severity.

13. The method of claim 10, further comprising providing said indication of historical average weather as one of an icon, text, and an indication of forecast accuracy.

14. The method of claim 10, further comprising comparing said indication of historical average weather with a forecast for said predetermined period of time to determine an accuracy of said forecast.

15. A system for providing an indication of historical weather for a location over a predetermined past period of time, comprising:
    a database that receives observation data for said location for said predetermined past period of time;
    a conversion engine that groups said observation data into sub-periods of time and converts said observation data in each sub-period of time to forecast data format;
    a forecast engine that processes the forecast data format for each sub-period to provide an indication of average weather for each sub-period;
    an aggregator that processes said indication of average weather for each sub-period into said indication of historical average weather over said predetermined past period of time; and
    an output system that generates an output of said indication of historical average weather.

16. The system of claim 15, wherein said formatted forecast data is ranked within each sub-period by severity.

17. The system of claim 16, wherein each said sub-period is ranked by severity.

18. The system of claim 15, wherein said indication of historical average weather is provided as one of an icon, text, and an indication of forecast accuracy.

19. The system of claim 15, further comprising a comparator that compares said indication of historical average weather with a forecast for said predetermined period of time to determine an accuracy of said forecast.

20. The system of claim 15, wherein the observation data is METAR data.

21. The method of claim 4, further comprising rolling up the converted forecasts utilizing said rankings to provide a best weather representation that encapsulates said groups.

* * * * *